United States Patent [19]
Sjolander et al.

[11] Patent Number: 5,639,273
[45] Date of Patent: Jun. 17, 1997

[54] GRINDING CUP AND HOLDER DEVICE

[75] Inventors: Kurt Robert Sjolander; Bo Thomas Sjolander, both of Oakville, Canada

[73] Assignee: C.M.E. Blasting & Mining Equipment Ltd., Oakville, Canada

[21] Appl. No.: 383,222

[22] Filed: Feb. 3, 1995

[51] Int. Cl.[6] .................................................. B24B 55/02
[52] U.S. Cl. ........................ 451/450; 451/270; 451/548; 451/342
[58] Field of Search ............................... 451/450, 56, 48, 451/408, 342, 548, 271; 279/102, 906; 408/143; 407/10, 33, 34; 81/177.85

[56] References Cited

U.S. PATENT DOCUMENTS

| | | | |
|---|---|---|---|
| 1,873,472 | 8/1932 | Pfauser | 81/177.85 |
| 2,704,681 | 3/1955 | Fischer | 279/906 |
| 4,523,411 | 6/1985 | Freerks | 451/450 |
| 4,616,738 | 10/1986 | Shurtliff | 408/143 |
| 4,858,388 | 8/1989 | Bice | 451/48 |
| 5,070,654 | 12/1991 | Manqvist et al. | 451/270 |
| 5,448,930 | 9/1995 | Sjolander et al. | 81/177.85 |

FOREIGN PATENT DOCUMENTS

| | | | |
|---|---|---|---|
| 2431339 | 3/1980 | France | 408/143 |
| 425539 | 4/1935 | United Kingdom | 408/143 |

Primary Examiner—Bruce M. Kisliuk
Assistant Examiner—George Nguyen

[57] ABSTRACT

The present invention relates to improvements in devices for use as grinding cups for grinding the hard metal pins or working tips of drill bits and more specifically, but not exclusively, for grinding the tungsten carbide cutting teeth or buttons of a drilling head and the means for detachably connecting the grinding cups to the grinding machine. The grinding cups consisting of a bottom grinding section and a top body section having top and bottom surfaces. The grinding section is formed from a material capable of grinding the tungsten carbide button bits such as a metal and diamond matrix. The peripheral edge in the bottom surface may be bevelled to facilitate the removal of steel from the face of the bit around the base of the button during grinding. A centrally disposed convex recess is formed in the bottom surface having the desired profile for the button to be ground. The body section has a centrally disposed cavity formed in the top surface of the grinding cup. This cavity is shaped and sized to permit the grinding cup to be detachably connected to the drive member of a grinding machine and rotated during the grinding operation. One or more passageways connect the floor of the cavity in the top surface of the grinding cup with the convex recess in the grinding section to permit a coolant, preferably water, optionally mixed with cutting oil, to be provided to the surface of the button during grinding, through one or more outlets.

17 Claims, 5 Drawing Sheets

GRINDING CUP AND HOLDER DEVICE

BACKGROUND OF THE INVENTION

1. Field of the invention

The present invention relates to improvements in devices for use as grinding cups for grinding the hard metal inserts or working tips of drill bits and more specifically, but not exclusively, for grinding the tungsten carbide cutting teeth or buttons of a drill bit and the means for detachably connecting the grinding cups to the grinding machine.

2. Description of the Prior Art

In down-the-hole drilling operations the cutting teeth (buttons) on the drill bits become flattened (worn) after continued use. Regular maintenance of the drill bit by regrinding (sharpening) the buttons to return them to substantially their original profile enhances, the bit life, speeds up drilling and reduces drilling costs. Regrinding should be undertaken when the wear of the buttons is optimally a third to a maximum of one-half the button diameter.

Different manual and semi-automatic grinding machines are known for grinding button bits (see for example U.S. Pat. No. 5,193,312; 5,070,654). In a conventional type of machine a grinding cup having the desired profile is rotated at high speed to grind the carbide button and the face of the bit surrounding the base of the button to return the button to substantially its original profile for effective drilling.

The grinding cups conventionally consist of a cylindrical body having top and bottom surfaces. The bottom or working surface consists of a diamond/metal matrix having a centrally disposed convex recess having the desired profile for the button to be ground. A bevelled rim around the recess removes steel from the face of the bit around the base of the button. An upright hollow stem projects from the top surface.

Water and/or air is provided through the hollow stem and a centrally disposed passageway in the cylindrical body of the grinding cup. A slot or flushing channel in the grinding surface helps disperse the water/air over the button surface being ground. The water/air flushes the surface of the button during grinding. There is a tendency for a nipple to form on the button in the area of the water/air outlet as there is no grinding surface in contact with the button at this point.

The grinding cups are conventionally manufactured by first machining a blank with the upright hollow stem projecting from its top surface. The blank is then pressed into a mould containing a hot diamond/metal mixture. The bottom surface of the blank is heated and bonds to the diamond/metal matrix. Alternatively the diamond/metal matrix can be formed into the grinding section and then bonded either by a shrink fit or with adhesives to a blank.

The grinding cups until recently were conventionally held in the grinding machine by inserting the stem in a chuck for detachable mounting of tools. Special tools such as chuck wrenches, nuts and collets were necessary to insert, hold and to remove the grinding cup into and out of the chuck.

To eliminate the need for chuck wrenches etc. the use of a shoulder drive on the grinding cups was recently developed. A diametrically extending recess at the free end of a hollow drive shaft of the grinding machine co-operates with a shoulder or cam means on the adjacent top surface of the grinding cup. The stem of the grinding cup is inserted into the hollow drive shaft and maybe held in place by one or more O-rings either located in a groove in the interior wall of the drive shaft or on the stem of the grinding cup. See for example Swedish Patent No. B 460,584 and co-pending U.S. patent application Ser. No. 08/305,176 both incorporated herein by reference.

Regardless of whether the grinding cup is retained in a chuck or a shoulder drive is utilized, the grinding cup is rigidly connected to the grinding machine and vibrations generated during the grinding operations are directly transferred to the grinding machine. Excessive vibration can result in:

a) High noise levels during grinding;

b) tiring impacts on the operator's hands and arms where manual grinding apparatus is being used;

c) inconsistent grinding quality, less accuracy of button profile and grinding traces.

d) accelerated wear on chuck and grinding machine components.

In co-pending U.S. patent application Ser. No. 08/305,176 a dampening element was inserted in the channel of the hollow drive shaft adjacent the stem of the grinding cup to help reduce vibrations.

SUMMARY OF THE INVENTION

It is an object of the present invention to provide a grinding cup that can be quickly and easily attached and removed from the grinding apparatus.

It is a further object of the present invention to reduce the manufacture costs of grinding cups.

It is a still further object of the present invention to eliminate the necessity to provide a flushing channel in the grinding surface of the grinding cups.

It is a still further object of the present invention to provide a holder device to retain the grinding cups of the present invention that helps minimize vibrations.

It is a still further object of the present invention to provide for improved grinding quality, increased accuracy of button profile and a better finish without grinding traces.

Accordingly the present invention provides a grinding cup consisting of a bottom grinding section and a top body section having top and bottom surfaces. The grinding section is formed from a material capable of grinding the tungsten carbide button bits such as a metal and diamond matrix. The peripheral edge in the bottom surface may be bevelled to facilitate the removal of steel from the face of the bit around the base of the button during grinding. A centrally disposed convex recess is formed in the bottom surface having the desired profile for the button to be ground. The body section has a centrally disposed cavity formed in the top surface of the grinding cup. This cavity is shaped and sized to permit the grinding cup to be detachably connected to the drive member of a grinding machine and rotated during the grinding operation. One or more passageways connect the floor of the cavity in the top surface of the grinding cup with the convex recess in the grinding section to permit a coolant, preferably water, optionally mixed with cutting oil, to be provided to the surface of the button during grinding, through one or more outlets.

Another embodiment of the present invention consists of a grinding cup consisting of a bottom grinding section and a top body section having top and bottom surfaces. A centrally disposed convex recess is formed in the bottom surface having the desired profile for the button to be ground. The body section is adapted for detachable connection to the drive member of a grinding machine by having for example either an upright hollow stem projecting from the top surface or a centrally disposed cavity in the top surface as described above. Two or more passageways are provided through the body section ending in outlets on the grinding surface of the convex recess in the grinding section to permit a coolant, preferably water, optionally mixed with cutting oil, to be provided to the surface of the button during grinding.

Another embodiment of the present invention consists of a holder device for detachable connection of a grinding cup to a grinding machine, said grinding machine having a pneumatically, hydraulically or electrically driven motor which drives an output shaft. Suitably connected to the output shaft by any conventional means is a holder device of the present invention. The holder device may be an integral extension of the output shaft or a separate attachment. The holder device consists of a rotatable drive member. The drive member is provided with a coaxial passageway extending the length thereof and through which coolant fluid may be directed to a grinding cup supported thereon. One end of the drive member is sized to fit within a corresponding sized cavity in the top surface of the grinding cup. The exterior wall at this end of the drive member is adapted to be retained in the cavity in the grinding cup. The other end of the drive member is adapted for connection to the drive shaft of the grinding apparatus.

Further features of the invention will be described or will become apparent in the course of the following detailed description.

BRIEF DESCRIPTION OF THE DRAWINGS

In order that the invention may be more clearly understood, the preferred embodiment thereof will now be described, in detail by way of example, with reference to the accompanying drawings, in which.

DETAILED DESCRIPTION OF PREFERRED EMBODIMENTS

Figure 1:
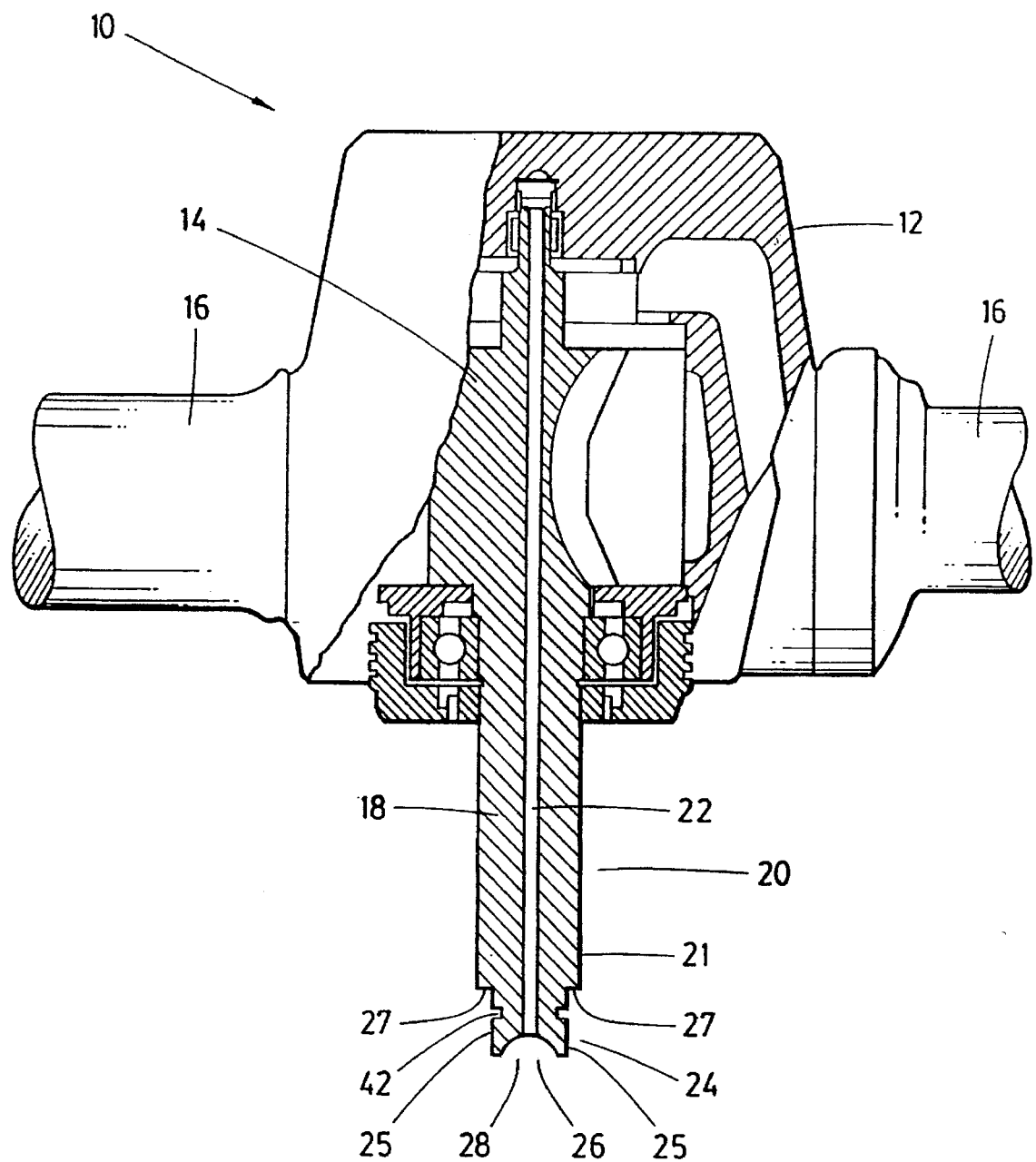
FIG. 1 is a side elevation partly in section of a grinding machine having a single air motor, the rotor of which is extended to form a drive member for holding a grinding
Figure 1A:
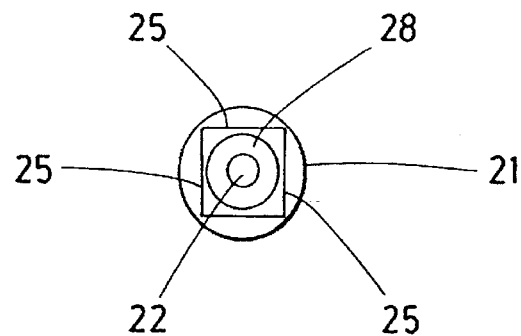
FIG. 1A is a bottom plan view of drive member of FIG. 1.
Figure 2:
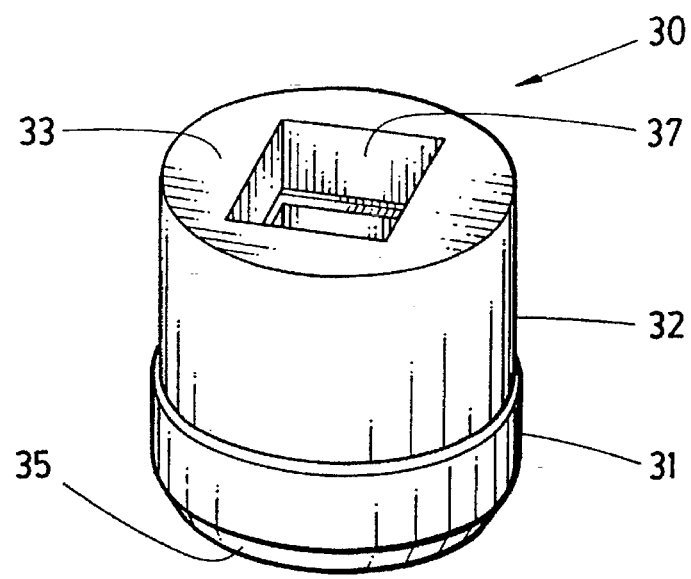
FIG. 2 is an enlarged perspective view of a grinding cup according to the invention to be driven by the drive member of FIG. 1.
Figure 3:
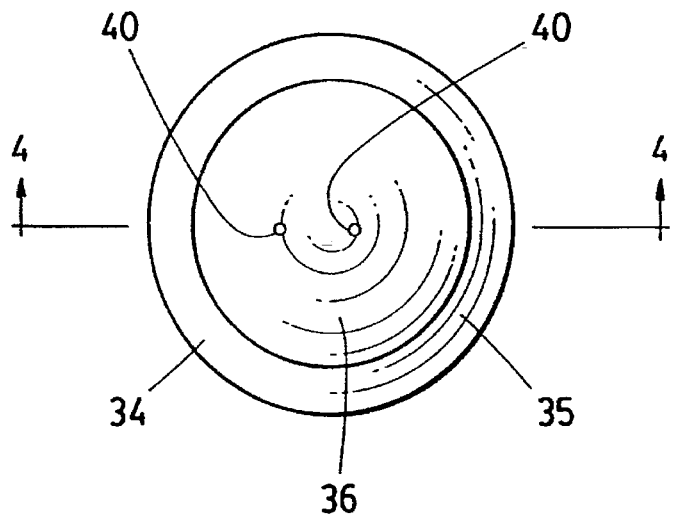
FIG. 3 is a bottom view of the grinding cup of FIG. 2.
Figure 4:
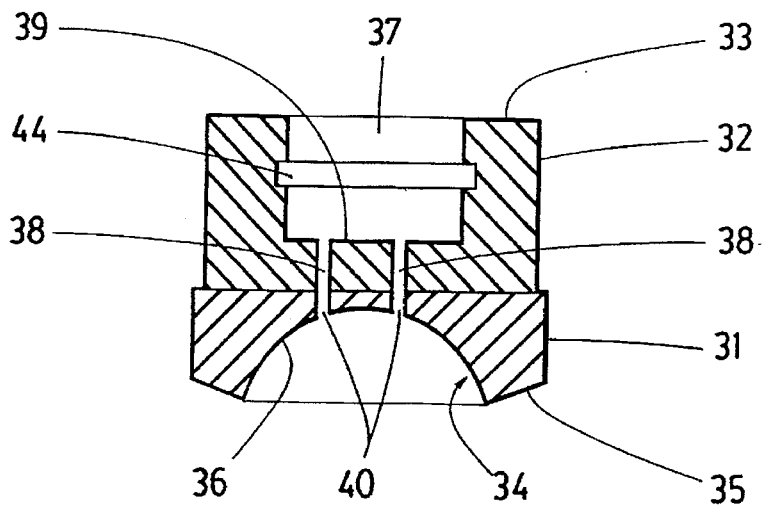
FIG. 4 is a cross section of the grinding cup of FIGS. 2 and 3 along A—A.

Referring to FIG. 1 to 5, a grinding machine 10 is illustrated which includes a motor housing or casing 12 within which is suitably supported a rotary motor, the illustrated motor being a pneumatically driven motor 14 adapted to be supplied with compressed air from a suitable source (not shown). The motor can be hydraulic, electric or the like without departing from the substance of the present invention. The dimensions of the casing 12 are such that the grinding machine may be easily handled manually. For the latter purpose, the casing is provided with handles 16 projecting diametrically oppositely outwardly from the casing. The motor 14 drives an output shaft 18. Suitably connected to the output shaft 18 by any conventional means is a holder device 20. In the illustrated embodiment in FIG. 1, the holder device 20 is an integral extension of the shaft 18 which constitutes a rotatable elongate drive member 21. The shaft 18 and drive member 21 are provided with a coaxial passageway 22 extending the length thereof and through which coolant fluid may be directed to a grinding cup 30 supported thereon, the grinding cup being shown in FIGS. 2–4 and described in detail below. An end portion 24 of the elongate drive member 21, extending from its free end 26, is adapted to fit within a corresponding sized cavity 37 in the top surface 33 of the grinding cup 30. In FIG. 1, the exterior wall 25 of elongate drive member 21 in the end portion 24 is machined to slide snugly within cavity 37 so that the top surface 33 of the grinding cup 30 abuts against shoulder 27 formed by the machining of the outer wall. 25 of the elongate drive member 21. Alternatively the end portion 24 could be threaded to screw into cavity 37. The opening 28 of passageway 22 has a larger diameter than the passageway so that coolant can be provided to the grinding cup passageways 38. FIGS. 1, 1A and 2 illustrate the end portion 24 of the drive shaft machined to a square cross section however any suitable shape can be used that will drive the grinding cup.

Figure 6A:
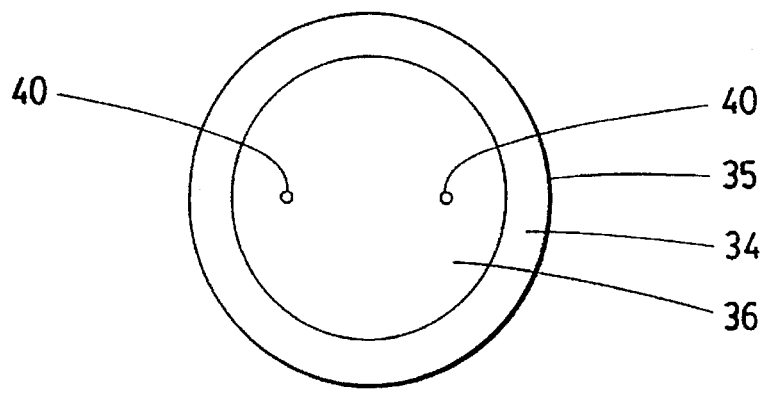
FIG. 6A is a bottom plan view of an arrangement for the coolant outlets in a grinding cup of the present invention.
Figure 6B:
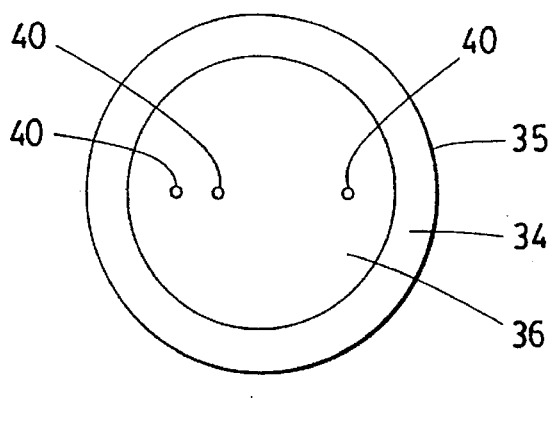
FIG. 6B is a bottom plan view of an alternative arrangement for the coolant outlets in a grinding cup of the present invention.
Figure 6C:
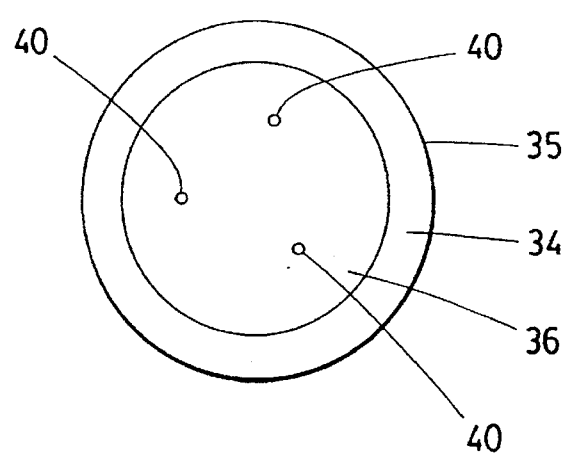
FIG. 6C is a bottom plan view of another alternative arrangement for the coolant outlets in a grinding cup of the present invention.

Referring now more particularly to FIG. 2, the grinding cup 30 consists of a grinding section 31 and a body section 32. In the preferred embodiment the grinding section 31 and body section 32 are integrally connected to form a substantially cylindrical grinding cup having top and bottom surfaces 33 and 34 respectively. The grinding section 31 is formed from a material capable of grinding the tungsten carbide button bits. In the preferred embodiment, the grinding section is formed from a metal and diamond matrix. The peripheral edge 35 in the bottom surface 34 is bevelled to facilitate the removal of steel from the face of the bit around the base of the button during grinding. A centrally disposed convex recess 36 is formed in the bottom surface 34 having the desired profile for the button to be ground. The body section 32 has a centrally disposed cavity 37 formed in the top surface 33 of the grinding cup. This cavity 37 is shaped and sized to permit the grinding cup to be detachably connected to the drive member 21 of the holder device and rotated during the grinding operation. One or more passageways 38 connect the floor 39 of cavity 37 with the recess 36 in the grinding section to permit a coolant, preferably water, optionally mixed with cutting oil or a water/air mist, to be provided to the surface of the button during grinding, through outlets 40. The coolant prevents excessive heat generation during grinding and flushes the surface of the button of material removed during grinding. In prior devices, which only use a single centrally disposed water outlet, there is a tendency for a nipple to form on the button in the area of the water outlet as there is no grinding surface in contact with the button at this point. In the preferred embodiment illustrated in FIGS. 6a, 6b and 6c alternative arrangements are shown for outlets 40 to prevent nipple formation and yet provide efficient coolant dispersal.

Figure 5:
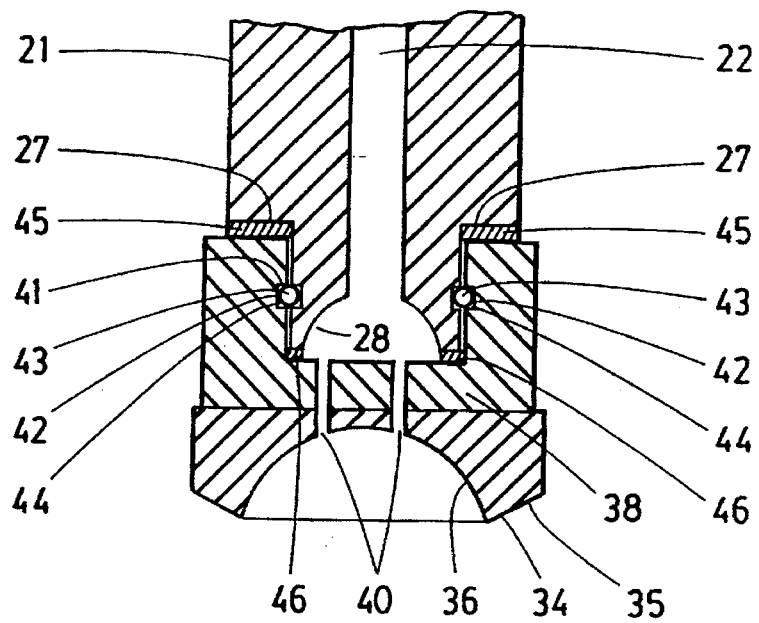
FIG. 5 is an enlarged side cross section of the grinding cup of FIG. 2 connected to the drive member of the grinding machine of FIG. 1.

In order to detachably retain the drive member 21 within the cavity 37 retaining means 41 are provided. In the preferred embodiment, as best illustrated in FIG. 5, the retaining means 41 comprises an annular groove 42 formed in the exterior wall 25 of the end portion 24 of drive member 21 in which an O-ring or expansion ring 43 is snugly received. The cup 30 is adapted to be mounted on drive member 21 by inserting the end portion 24 of drive member 21 into the cavity 37. The length of the end portion 24 and the depth of the cavity 37 are such that when the cup 30 is fully mounted on the holding device, the O-ring 43 received within the groove 42 is engaged in a slot 44 formed in the side wall of the cavity 37.

Fitted around the drive member 21 abutting the shoulder 27 is a damping element preferably an elastic washer 45 formed of rubber or other suitable elastomeric material. A second dampening element 46, preferably an elastic washer, may also be inserted into the bottom of cavity 37 so that the free end of the drive shaft compressingly engages the second dampening element 46. With the cup so mounted, the vibrations generated in the grinding cup 30 during the grinding operation are substantially absorbed by the dampening elements 45 and 46 and are thus not transmitted to the handles 16, reducing the fatigue of the operator of the machine and providing the other advantages described herein before. In addition the second washer 46 helps prevent coolant from spraying out around the holder device and the grinding cup. The use of the O-ring 43 to secure the cup 30 in the holder device permits easy mounting and removal of the grinding cup 30 from the holding device 20. As will be apparent, it is desirable that the slot 44 in the cavity 37 be slightly larger than the groove 42 whereby the O-ring 43 will remain seated on the shaft as the grinding cup is detached.

Figure 7:
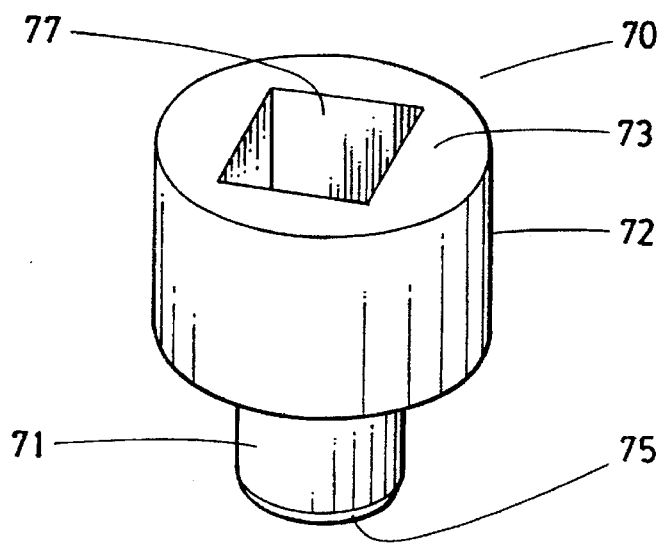
FIG. 7 is an enlarged perspective view of another grinding cup according to the invention for grinding small button
Figure 7A:
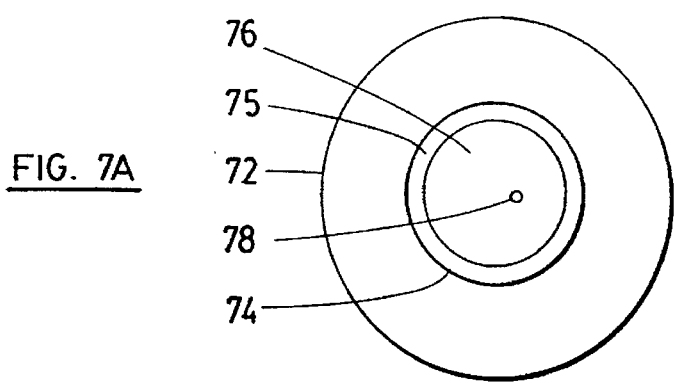
FIG. 7A is a bottom plan view of the grinding cup of FIG. 7.

FIG. 7 illustrates a grinding cup 70 according to the present invention for grinding small button bits, having a top body section 72 and a smaller diameter bottom grinding section 71. On smaller bits the buttons may be closer together and accordingly in addition to reducing the diameter of the recess 76 in the grinding section 71 to match the profile of the button to be ground the diameter of the grinding section 71 also has to be reduced to fit between adjacent buttons. However it is desirable to maintain a constant size for the body section for two reasons: (1) the diameter of the body section must be large enough to accommodate the drive member of the holder device and (2) the cavity in the top of the grinding cup should be as large as possible so that the drive member gets a could grip on the grinding cup. The bottom surface 74 of the grinding section 71 has a bevelled edge 75 to facilitate removal of the steel around the base of the button.

Figure 8:
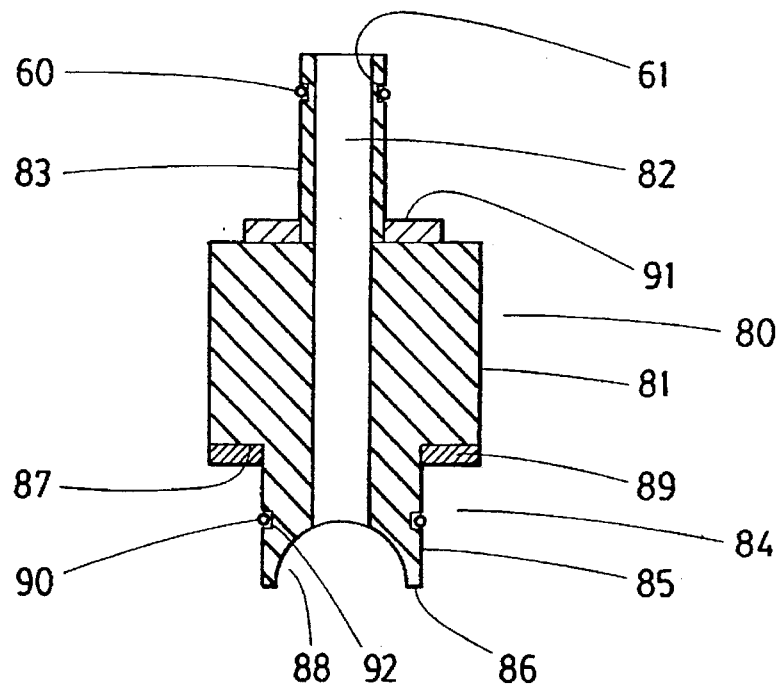
FIG. 8 is an enlarged side cross section of an alternative holder device and grinding cup of the present invention.
Figure 8A:
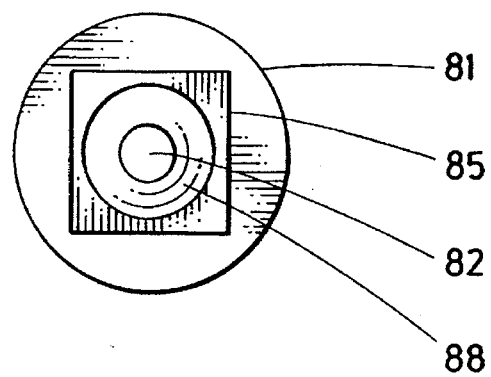
FIG. 8A is a bottom plan view of the holder device of FIG. 8.

In FIGS. 8 and 8A an alternative form of holder device is illustrated for use with a grinding machine which incorporates a diametrically extending recess at the free end of a hollow drive shaft that co-operates with a shoulder or cam means on the adjacent top surface of the grinding cup as described in either Swedish Patent No. B 460,584 or co-pending U.S. patent application Ser. No. 08/305,176. By utilizing a holder device 80 as illustrated in FIG. 8 and 8A the grinding cups of the present invention can be used without the necessity of replacing the rotor on the grinding machine. The holder device 80 comprises a rotatable drive member 81 having a coaxial passageway 82 along its length.

One end 86 of the drive member is adapted to fit within the cavity 37 on the top surface of the grinding cup of the present invention. In the illustrated embodiment, the wall 85 of drive member 21 is machined to a square cross section to fit within a square cavity in the grinding cup. However as noted in connection with FIG. 1 other cross sections are possible that will provide the necessary rotation without slipping to the grinding cup: hexagonal, oval, circular with flattened opposite sides or threaded. A dampening element consisting of an elastic washer 89 is placed around the drive member in the machined end and abuts against shoulder 87. The opening 88 of passageway 82 is expanded to permit coolant to reach the passageways 38 in the grinding cup. A hollow vertical upright stem 83 is centrally located on the top surface of the drive member 81. Cam means or shoulder 91 is provided at the base of the stem 83 and is sized to engage with the diametrically extending recess at the free end of a hollow drive shaft of the grinding machine. The hollow stem is inserted into the hollow drive shaft of the grinding machine and maybe held in place by one or more O-rings 60 either located in one or more grooves 61 on the stem of the grinding cup. The O-ring 60 when the stem 83 is inserted into the hollow drive shaft of the grinding machine engages in a groove or slot in the interior wall of the drive shaft and cam or shoulder 91 fits in the diametrically extending recess at the free end of a hollow drive shaft of the grinding machine. The drive member 81 is equipped with means for retaining the grinding cup. A peripheral groove 92 is provided in the machined wall 85 at end portion 84. An O-ring 90 or expansion clip or spring means is inserted into groove 92. When the drive member 81 is inserted into the cavity 37 of the grinding cup the O-ring 90 fits in slot 44 in the side wall of the cavity 37. Alternatively where the stem 83 of the holder device 80 is to be inserted into a chuck on the end of the drive shaft, the O-ring 60 and shoulder 91 may be eliminated.

Figure 9:
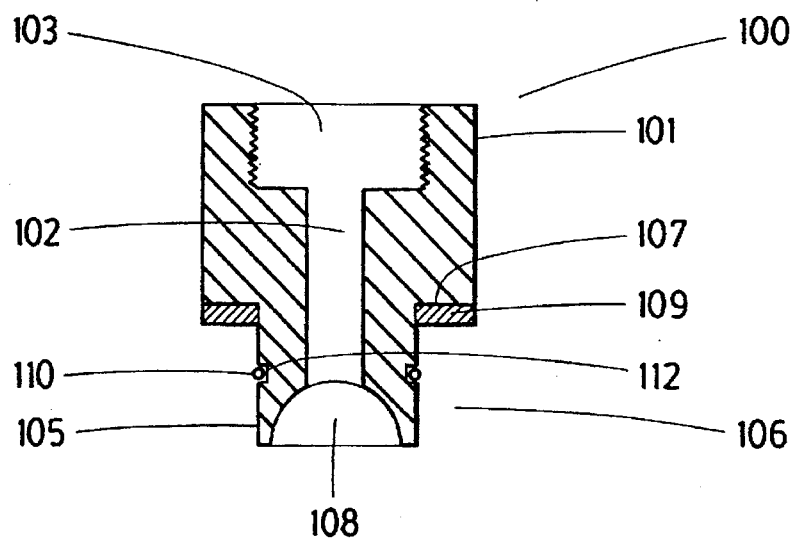
FIG. 9 is an enlarged side cross section of an alternative holder device and grinding cup of the present invention.

In FIG. 9 another alternative form of holder device is illustrated for use with a grinding machine which incorporates a threaded end on the drive shaft to which a chuck is normally connected for holding the grinding cup. By utilizing a holder device 100 as illustrated in FIG. 9 the grinding cups of the present invention can be used without the necessity of replacing the rotor on the grinding machine. The holder device comprises a rotatable drive member 101 having a coaxial passageway 102 along its length. One end 106 of the drive member is adapted to fit within the cavity 37 on the top surface of the grinding cup of the present invention. In the illustrated embodiment, the wall 105 of drive member 101 is machined to a square cross section to fit within a square cavity in the grinding cup. A dampening element consisting of an elastic washer 109 is placed around the drive member in the machined end and abuts against shoulder 107. The opening 108 of passageway 102 is expanded to permit coolant to reach the passageways 38 in the grinding cup. A threaded hole 103 is centrally located on the top surface of the drive member 101 and is coaxial with passageway 102. The holder device can be screwed on to the threaded end of a hollow drive shaft of the grinding machine. The drive member 101 is equipped with means for retaining the grinding cup as in FIG. 8. A peripheral groove 112 is provided in the machined wall 105. An O-ring 110 or expansion clip or spring means is inserted into groove 112. When the end portion 106 is inserted into the cavity 37 of the grinding cup the O-ring 110 engages with slot 44 in the side wall of cavity 37.

Additions and modifications to the device as described above can be made. For example, it will be apparent that rather than the holder device 20 being an integral extension of shaft 18, the holder device could consist of a separate component adapted to be connected to the end of shaft 18 by co-operating threads, chuck etc. In addition two or more O-rings could be mounted on the drive member 21 to engage in cooperative recesses formed in the side wall of the cavity 37 in the grinding cup to more securely and more stably connect the grinding cup to the grinding machine. Rather than utilizing an O-ring or expansion ring, retaining means 41 could consist of one or steel beads spring biased in a slot(s) in the wall 25 of drive member 21 and adapted to engage with the slot 44 in the cavity 37 in the grinding cup. In place of the elastic washer 45 or dampening element 46 or in supplement thereto a coil spring could be utilized. The shaft opening 22 also can permit coolant air to be passed to the grinding surface of recess 36 to extract heat therefrom. The holder device of the present invention can be used with the hand held grinding machine illustrated in FIG. 1 or with semi automatic grinding apparatus where the grinding head is carried on a robot arm or similar device.

Having illustrated and described a preferred embodiment of the invention and certain possible modifications thereto, it should be apparent to those of ordinary skill in the art that the invention permits of further modification in arrangement and detail.

It will be appreciated that the above description related to the preferred embodiment by way of example only. Many variations on the invention will be obvious to those knowledgeable in the field, and such obvious variations are within the scope of the invention as described and claimed, whether or not expressly described.

We claim:

1. A grinding cup for detachable connection to the drive shaft of a grinding machine for grinding buttons on drill bits, said grinding cup having top and bottom surfaces and consisting of a lower grinding section and an upper body section; said lower grinding section having a centrally disposed recess formed in the bottom surface of said grinding cup and having the desired profile for the button to be ground; wherein the peripheral edge in the bottom surface of the grinding cup is bevelled to facilitate the removal of steel from the face of the bit around the button during grinding; said upper body section having a centrally disposed cavity formed in the top surface of the grinding cup; said cavity shaped and sized to permit the drive shaft of a grinding machine to fit snugly within the cavity and retaining means for detachably connecting the grinding cup to the drive shaft of the grinding machine.

2. A grinding cup according to claim 1 wherein one or more passageways connect the floor of the cavity in the top surface of the grinding cup with the recess in the grinding section to permit a coolant to be provided to the surface of the button during grinding through one or more outlets.

3. A grinding cup according to claim 1 where the grinding section is formed from a material capable of grinding tungsten carbide button bits.

4. A grinding cup according to claim 1 where the grinding section is formed from a steel and diamond matrix.

5. A grinding cup according to claim 1 wherein the grinding section and body section are integrally connected to form a substantially cylindrical grinding cup.

6. A grinding cup according to claim 1 wherein said retaining means includes a slot formed in the wall of the cavity in said top surface of the grinding cup.

7. A grinding cup for detachable connection to the drive shaft of a grinding machine for grinding buttons on drill bits, said grinding cup having top and bottom surfaces and consisting of a lower grinding section and an upper body section; said lower grinding section having a centrally disposed recess formed in the bottom surface of said grinding cup and having the desired profile for the button to be ground; wherein the peripheral edge in the bottom surface of said grinding cup is bevelled to facilitate the removal of steel from the face of the bit around the button during grinding; retaining means for detachably connecting the grinding cup to the drive shaft of the grinding machine and two or more passageways through said grinding section and said body section to permit coolant to be provided to the said recess in the bottom surface of the grinding cup.

8. A grinding cup according to claim 7 wherein said retaining means includes a centrally disposed cavity formed in the top surface of the grinding cup; said cavity shaped and sized to permit the drive shaft of a grinding machine to fit snugly within the cavity.

9. A grinding cup according to claim 7 where the grinding section is formed from a material capable of grinding tungsten carbide button bits.

10. A grinding cup according to claim 7 where the grinding section is formed from a metal and diamond matrix.

11. A grinding cup according to claim 7 wherein the grinding section and body section are integrally connected to form a substantially cylindrical grinding cup.

12. A holder device for detachable connection of the grinding cups according to claim 1 to a motor driven grinding machine for grinding button bits said grinding machine having an output shaft, said holder device comprising:

(a) a rotatable drive member having one end adapted to be secured to said output shaft of said grinding machine and an opposite free end adapted to extend outwardly away from said grinding machine, said drive member having a passageway formed therein;

(b) the free end of said drive member adapted to fit within the centrally disposed cavity on the top surface of said grinding cup for driveably engaging said grinding cup to said free end of said drive member;

(c) retaining means for operative engagement between said drive member and said cavity for removably retaining said grinding cup on said drive member (d) said output shaft of said grinding machine having a passageway formed therein and interengaging drive means on said end of the rotatable drive member of said holder device adapted to be secured to output shaft and said output shaft for driveably engaging said holder device to said free end of said output shaft;

(e) a vertical upright stem attached to said end of the rotatable drive member of said holder device adapted to be secured to said output shaft and extending outwardly therefrom, said stem being adapted to be received in said passageway in the said output shaft of said grinding machine; and (f) elastic means for operative engagement between said stem and said passageway for removably retaining said stem in said passageway of said output shaft.

13. A holder device according to claim 12 wherein the free end of said drive member is machined to a non circular cross section to fit slidably but snugly in a corresponding sized and shaped cavity on the top surface of said grinding cup.

14. A holder device according to claim 13 wherein the free end of said drive member is machined to a square cross section.

15. A holder device according to claim 12 wherein the free end of said drive member is threaded to fit in a corresponding threaded cavity on the top surface of said grinding cup.

16. A holder device according to claim 12 wherein a dampening element is disposed around the free end of said drive member so that said damping element bears against said top surface of said grinding cup when said drive member is inserted in said cavity.

17. A holder device according to claim 12 wherein said interengaging drive means comprises a diametrically extending recess formed at said free end of said output shaft and a cam portion on said holder device at the base of said stem adapted to operatively engage with said recess when said stem is mounted in said passageway of said output shaft.

* * * * *